United States Patent [19]

Sakazume et al.

[11] Patent Number: 5,244,973

[45] Date of Patent: Sep. 14, 1993

[54] POLYAMIDE RESIN THERMOPLASTIC BLEND CONTAINING A MULTI-PHASE STRUCTURE THERMOPLASTIC RESIN COMPATIBILIZATION AGENT AND PROGESS FOR THE PRODUCTION THEREOF

[75] Inventors: Suehiro Sakazume, Fujisawa; Yuichi Orikasa, Yokohama, both of Japan

[73] Assignee: Nippon Petrochemicals Co., Ltd., Japan

[21] Appl. No.: 564,716

[22] Filed: Aug. 8, 1990

[30] Foreign Application Priority Data

Aug. 11, 1989 [JP] Japan .................................. 1-209219

[51] Int. Cl.$^5$ .............................................. C08L 77/00
[52] U.S. Cl. ........................................ 525/66; 525/67; 525/68; 525/69; 525/166; 525/179
[58] Field of Search .......................................... 525/66

[56] References Cited

U.S. PATENT DOCUMENTS 4,962,148  10/1990  Orikasa et al. ...................... 524/504

FOREIGN PATENT DOCUMENTS 0304041  2/1989  European Pat. Off. .

Primary Examiner—Ana L. Carrillo
Attorney, Agent, or Firm—Ostrolenk, Faber, Gerb & Soffen

[57] ABSTRACT

A thermoplastic resin composition is here disclosed which is prepared by blending (I) 99 to 1% by weight of a polyamide resin, (II) 1 to 99% by weight of at least one kind of resin selected from the group consisting of a polyphenylene ether resin alone or a mixture of the polyphenylene ether resin and a styrene polymer, an aromatic polyester resin, a polycarbonate resin, a polyoxymethylene resin, an ABS resin, a polyarylene sulfide resin and a polyarylate resin, and (III) 0.1 to 100 parts by weight, based on 100 parts by weight of the aforesaid resins (I)+(II), of a multi-phase structure thermoplastic resin.

10 Claims, No Drawings

POLYAMIDE RESIN THERMOPLASTIC BLEND CONTAINING A MULTI-PHASE STRUCTURE THERMOPLASTIC RESIN COMPATIBILIZATION AGENT AND PROGESS FOR THE PRODUCTION THEREOF

BACKGROUND OF THE INVENTION

1. Field of the Invention

The present invention relates to a thermoplastic resin composition having excellent heat resistance, impact resistance, oil resistance and water resistance, and to a method for preparing the same. The composition of the present case can be widely utilized as a material for automobile parts, electrical, electronic and machine parts, industrial parts, and the like.

2. Description of the Prior Art

Polyamide resins, polyphenylene ether resins, aromatic polyester resins, polycarbonate resins, polyoxymethylene resins, ABS resins, polyarylene sulfide resins and polyarylate resins are used in many fields because of their excellent mechanical characteristics, heat resistance, chemical resistance and the like.

In recent years, various researches have been carried out with the intention of heightening the functions of products and decreasing the costs thereof, and above all, it has been attempted to utilize various features of plural plastics for the purpose of adding many functions to the products.

The polyamide resins are excellent in moldability, heat stability, wear resistance and solvent resistance, and thus they are employed in various kinds of molded articles. However, the polyamide resins have a high hygroscopicity, and therefore the dimensional stability thereof is poor, so that applications of these resins are limited at times.

On the other hand, the polyphenylene ether resins are excellent in mechanical properties, electrical properties and heat resistance, and what is better, they are also good in dimensional stability. Therefore, these resins are useful as raw material resins to be molded. However, they are inconveniently poor in workability, oil resistance and impact resistance. The aromatic polyester resins are excellent in mechanical properties, stiffness and strength, but poor in impact resistance and heat resistance. The polycarbonate resins are excellent in heat resistance, mechanical properties and impact resistance but poor in chemical resistance. Polyoxymethylene resins are excellent in dimensional stability and mechanical properties but poor in impact resistance. The ABS resins are excellent in impact resistance but poor in chemical resistance. The polyarylene sulfide resins are excellent in heat resistance and flame retardance but poor in ductility and thus brittle. The polyarylate resins are excellent in heat resistance but disadvantageously poor in impact resistance.

Accordingly, it can be presumed that if the polyamide resin (I) is blended with one or more resins (II) selected from the group consisting of the polyphenylene ether resins, the aromatic polyester resins, the polycarbonate resins, the polyoxymethylene resins, the ABS resins, the polyarylene sulfides resins and the polyarylate resins, a resin composition can be obtained in which the features inherent in the polyamide resin (I) are maintained and the drawbacks thereof are eliminated and to which the features of the other resin (II) are added.

For example, Japanese Patent Publication No. 45-997 discloses that the polyamide resin is blended with the polyphenylene ether resin in order to improve the oil resistance and the workability of the latter resin, but the compatibility of the polyphenylene ether resin with the polyamide resin is very bad. Accordingly, the resulting resin composition has poor mechanical properties (particularly when the content of the polyamide is in excess of 20% by weight, the mechanical properties are noticeably poor). In addition, the molded articles of such a blend obtained by injection molding exhibit a delamination phenomenon, with the result that any preferable molded articles cannot be obtained.

As relatively excellent techniques for preventing the above-mentioned delamination phenomenon, there are a process described in Japanese Laid-open Patent Publication No. 60-36150 in which a copolymer comprising a styrene compound and an $\alpha,\beta$-unsaturated dicarboxylic anhydride is used as a compatibilizing agent, and a process described in Japanese Laid-open Patent Publication Nos. 60-260649 and 62-27456 in which a copolymer comprising ethylene or a styrene compound and an unsaturated compound containing an epoxy group is used as the compatibilizing agent, and a process described in Japanese Laid-open Patent Publication No. 64-48846 in which a multi-phase structure thermoplastic resin is used as the compatibilizing agent. The above-mentioned first process has the drawback that bubbles are formed probably owing to the decomposition of the dicarboxylic acid in a step of heating/molding, and in the above-mentioned second and third processes, the improvement effect of impact resistance is still insufficient.

Moreover, in Japanese Patent Publication Nos. 47-19101 and 47-24465 and Japanese Laid-open Patent Publication Nos. 48-56742, 49-114661, 56-34754 and 57-49657, some attempts have been made to solve problems attributed to the combination of the polyamide resin and the polyester resin by changing blend compositions of these resins or by additionally using a fibrous reinforcing agent or an inorganic filler as an additive in compliance with the intended purposes. However, molded articles obtained by these procedures have poor mechanical properties, and for example, the delamination phenomenon tends to occur in these articles.

Furthermore, Japanese Laid-open Patent Publication Nos. 62-277462 and 62-283146 disclose techniques which use an ethylene copolymer containing an epoxy group and an ethylene copolymer containing an acid anhydride together in order to improve the affinity between the polyamide resin and the polyacrylate resin. These polymers are effective to heighten impact strength, but they have the disadvantage that stiffness and heat resistance of a composition thereof are liable to fall off.

The other resins are also tried to improve physical properties by various combinations with the polyamide resin. However, they are different from the polyamide resin in chemical structure, and for this reason, no affinity is present therebetween, so that features of the respective resins are scarcely utilized.

SUMMARY OF THE INVENTION

Therefore, an object of the present invention is to provide a thermoplastic resin composition which comprises a polyamide resin and one or more kinds of resins selected from the group consisting of a polyphenylene ether resin, an aromatic polyester resin, a polycarbonate resin, a polyoxymethylene resin, an ABS resin, a polyarylene sulfide resin and a polyarylate resin and which effectively prevents delamination at the time of the molding thereof and is excellent in heat resistance, dimensional stability, moldability, impact resistance and oil resistance. Another object of the present invention is to provide a method for preparing the aforesaid thermoplastic resin composition.

The inventors of the present application have intensively researched to solve the above-mentioned problems, and as a result, they have found that when a specific multi-phase structure thermoplastic resin is blended, as a compatibilizing agent, with a polyamide resin and one or more kinds of resins selected from the group consisting of a polyphenylene ether resin, an aromatic polyester resin, a polycarbonate resin, a polyoxymethylene resin, an ABS resin, a polyarylene sulfide resin and a polyarylate resin, heat resistance of the polyphenylene ether resin is obtained and impact resistance and oil resistance are further improved, while dimensional stability and moldability are maintained, and that melting/kneading of these raw materials should be carried out at a certain optimum temperature. The present invention has been achieved on the basis of the above-mentioned knowledge.

That is, the first aspect of the present invention is directed to a thermoplastic resin composition containing (I) 99 to 1% by weight of a polyamide resin, (II) 1 to 99% by weight of at least one kind of resin selected from the group consisting of a polyphenylene ether resin alone or a mixture of the polyphenylene ether resin and a styrene polymer, an aromatic polyester resin, a polycarbonate resin, a polyoxymethylene resin, an ABS resin, a polyarylene sulfide resin and a polyarylate resin and, (III) 0.1 to 100 parts by weight, based on 100 parts by weight of the aforesaid resins (I) +(II), of a multi-phase structure thermoplastic resin which is composed of 5 to 95% by weight of an acid group-containing olefin polymer or copolymer and 95 to 5% by weight of a vinyl polymer or copolymer obtained from at least one kind of vinyl monomer, either of both the components being in the state of a dispersion phase having a particle diameter of 0.001 to 10 μm.

The second aspect of the present invention is directed to a method for preparing a thermoplastic resin composition which comprises the step of melting and mixing a polyamide resin (I) and at least one kind of resin (II) selected from the group consisting of a polyphenylene ether resin alone or a mixture of the polyphenylene ether resin and a styrene polymer, an aromatic polyester resin, a polycarbonate resin, a polyoxymethylene resin, an ABS resin, a polyarylene sulfide resin and a polyarylate resin with a graft polymerization precursor which is obtained by first adding at least one kind of vinyl monomer, at least one kind of radical polymerizable or copolymerizable organic peroxide and a radical polymerization initiator to an aqueous suspension of an acid group-containing olefin polymer or copolymer, heating the suspension under such conditions that the decomposition of the radical polymerization initiator does not occur substantially, in order to impregnate the acid group-containing olefin polymer or copolymer with the vinyl monomer, the radical polymerizable or copolymerizable organic peroxide and the radical polymerization initiator, and then raising the temperature of this aqueous suspension, when the degree of the impregnation has reached 50% by weight or more of the original total weight of the vinyl monomer, the peroxide and the initiator, in order to copolymerize the vinyl monomer with the radical polymerizable or copolymerizable organic peroxide in the acid group-containing olefin polymer or copolymer, or alternatively melting and mixing, with the above-mentioned resins (I) and (II), a multi-phase structure thermoplastic resin (III) obtained by previously melting/kneading the graft polymerization precursor at a temperature in a range of from 100° to 300° C.

DETAILED DESCRIPTION OF THE INVENTION

Examples of a polyamide resin (I) used in the present invention include aliphatic polyamide resins such as 6-nylon, 6,6-nylon, 6,10-nylon, 6,12-nylon, 11-nylon, 12-nylon and 4,6-nylon; aromatic polyamide resins such as polyhexamethylenediamineterephthalamide, polyhexamethylenediamineisophthalamide and a polyamide having a xylene group; modified compounds thereof and mixtures thereof. The particularly preferable polyamide resins are 6-nylon and 6,6-nylon.

Examples of the polyphenylene ether resin used in the present invention are polymers obtained by subjecting phenol compounds to oxidative polymerization with oxygen or a gas containing oxygen by the use of a coupling catalyst, the aforesaid phenol compounds being represented by the general formula

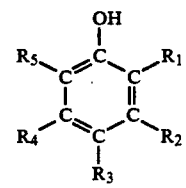

(wherein $R_1$ to $R_5$ are selected from the group consisting of a hydrogen atom, a halogen atom, a hydrocarbon group and a substituted hydrocarbon group, and one of them is always the hydrogen atom).

Typical examples of from R1 to R5 in the above-mentioned general formula include hydrogen, chlorine, fluorine, bromine, iodine, methyl, ethyl, propyl, butyl, chloroethyl, hydroxyethyl, phenylethyl, benzyl, hydroxymethyl, carboxyethyl, cyanoethyl, phenyl, chlorophenyl, methylphenyl, dimethylphenyl and ethylphenyl.

Typical examples of the above-mentioned general formula include phenol, o-, m- and p-cresol, 2,6-, 2,5-, 2,4- and 3,5-dimethylphenol, 2-methyl-6-phenylphenol, 2,6-diphenylphenol, 2,6-dimethylphenol, 2-methyl-6-ethylphenol, and 2,3,5-, 2,3,6- and 2,4,6-trimethylphenols. These phenol compounds can be used in a combination of two or more thereof.

In addition, as the polyphenylene ether resin, there can also be used copolymers which are obtained from the above-mentioned phenol compounds having the above-mentioned general formula and phenol compounds other than what are represented by the above-mentioned general formula, for example, divalent phenols such as bisphenol A, tetrabromobisphenol A, resorcin and hydroquinone.

Examples of the styrene polymer used in the present invention include homopolymers such as polystyrene, poly(α-methylstyrene) and poly(p-methylstyrene), highly impact-resistant polystyrenes modified with various rubbers such as butadiene rubber, styrene-butadiene copolymer, ethylene-propylene copolymer and ethylene-propylene-diene copolymer, styrene-maleic anhydride copolymer, styrene-acrylonitrile copolymer, styrene-acrylonitrile-butadiene copolymer and styrene-methyl methacrylate copolymer. This kind of styrene resin is used in an amount of 0 to 95% by weight with respect to the polyphenylene ether resin.

The aromatic polyester used in the present invention has an aromatic ring on a chain unit of the polymer and is a polymer or a copolymer, which can be obtained by condensation reaction, containing an aromatic dicarboxylic acid (or a derivative for forming its ester) and a diol (or a derivative for forming its ester) as the main components.

Examples of the aromatic dicarboxylic acid include terephthalic acid, isophthalic acid, phthalic acid, 2,6-naphthalenedicarboxylic acid, 1,5-naphthalenedicarboxylic acid, bis(p-carboxyphenyl)methane, anthracenedicarboxylic acid, 4,4'-diphenylcarboxylic acid, 4,4'-diphenyl ether dicarboxylic acid, 1,2-bis(phenoxy)ethane-4,4'-dicarboxylic acid and derivatives for forming esters thereof.

Examples of the diol component include aliphatic diols having 2 to 10 carbon atoms such as ethylene glycol, propylene glycol, 1,4-butanediol, neopentyl glycol, 1,5-pentanediol, 1,6-hexanediol, decamethylene diglycol and cyclohexane diol, long chain glycols having a molecular weight of 400 to 6,000 such as polyethylene glycol, poly-1,3-propylene glycol and polytetramethylene glycol, and mixtures thereof.

Typical preferable thermoplastic aromatic polyester used in the present invention include polyethylene terephthalate, polypropylene terephthalate, polybutylene terephthalate, polyhexamethylene terephthalate, polyethylene-2,6-naphthalate and polyethylene-1,2-bis(phenoxy)ethane-4,4'-dicarboxylate. Above all, polyethylene terephthalate and polybutylene terephthalate are more preferable.

The intrinsic viscosity of these thermoplastic aromatic polyesters can be measured at 25±0.10° C. at a concentration of 0.32 g in 100 ml of a solution of trifluoroacetic acid (25)/methylene chloride (75). The preferable intrinsic viscosity is from 0.4 to 4.0 dl/g. When the intrinsic viscosity is less than 0.4 dl/g, the thermoplastic aromatic polyester resin cannot exert sufficient mechanical strength unpreferably. Conversely, when it is more than 4.0 dl/g, flowability of the resin deteriorates at the time of melting, so that the surface gloss of molded articles falls off unpreferably.

The polycarbonate resin used in the present invention include 4,4-dioxyallylalkane polycarbonates typified by a polycarbonate of 4,4-dihydroxydiphenyl-2,2-propane (generally called bisphenol A), but above all, 4,4-dihydroxydiphenyl-2,2-propane polycarbonate having a number average molecular weight of 15,000 to 80,000 is preferable. This kind of polycarbonate may be prepared by an optional method. For example, 4,4-dihydroxydiphenyl-2,2-propane polycarbonate may be prepared by blowing phosgene into 4,4-dihydroxydiphenyl-2,2-propane as a dioxine compound in the presence of an aqueous caustic alkali solution and a solvent, or alternatively by carrying out ester interchange between 4,4-dihydroxydiphenyl-2,2-propane and diester carbonate in the presence of a catalyst.

Examples of a polyoxymethylene resin used in the present invention include an oxymethylene homopolymer substantially comprising an oxymethylene unit alone prepared from a raw material of a cyclic oligomer such as a formaldehyde monomer or its trioxane or tetraoxane; and an oxymethylene copolymer comprising an oxyalkylene unit having two or more carbons and an oxymethylene unit prepared from the above-mentioned raw material and ethylene oxide, propylene oxide, epichlorhydrin, 1,3-dioxolane, or a cyclic ether such as the formal of glycol or the hormal of diglycol.

The ABS resin used in the present invention is a graft copolymer (a) obtained by polymerizing, in the presence of a conjugated diene rubber, two or more kinds of compounds selected from the group consisting of vinyl cyanide compounds, aromatic vinyl compounds and alkyl ester compounds of unsaturated carboxylic acids. If necessary, the ABS resin may contain a copolymer (b) obtained by polymerizing two or more compounds selected from the group consisting of vinyl cyanide compounds, aromatic vinyl compounds and alkyl ester compounds of unsaturated carboxylic acids.

The composition ratio between the conjugated diene rubber and the above-mentioned compounds in the graft copolymer (a) is not limited particularly, but it is preferred that the conjugated diene rubber is in a ratio of 5 to 80% by weight and the above-mentioned compounds are in a ratio of 95 to 20% by weight. Furthermore, the composition of the above-mentioned compounds is preferably composed of 0 to 30% by weight of the vinyl cyanide compound, 30 to 80% by weight of the aromatic vinyl compound and 0 to 70% by weight of the alkyl ester compound of the unsaturated carboxylic acid. Incidentally, the particle diameter of the conjugated diene rubber is not limited particularly, but it is preferably in the range of 0.05 to 1 μm. The composition of the above-mentioned compounds constituting the copolymer (b) is preferably composed of 0 to 30% by weight of the vinyl cyanide compound, 50 to 90% by weight of the aromatic vinyl compound and 0 to 40% by weight of the alkyl ester compound of unsaturated carboxylic acid. The intrinsic viscosity [30° C., dimethylformadimde (DMF)] of the copolymer (b) is not limited particularly, but it is preferably in the range of 0.25 to 1.0.

Examples of the conjugated diene rubber include polybutadiene, butadiene-styrene copolymer and butadiene-acrylonitrile copolymer.

Examples of the vinyl cyanide compound include acrylonitrile and methacrylonitrile, and examples of the aromatic vinyl compound include styrene, α-methylstyrene, vinyltoluene, dimethylstyrene and chlorostyrene. Moreover, examples of the alkyl ester compound of the unsaturated carboxylic acid include methyl acrylate, ethyl acrylate, butyl acrylate, methyl methacrylate and hydroxyethyl acrylate.

The ABS resin may be prepared by an emulsion polymerization process, a suspension polymerization process, a solution polymerization, a mass polymerization, an emulsion-suspension polymerization process or the like.

The polyarylene sulfide resin used in the present invention is a polymer represented by the general formula

wherein Ar is a divalent aromatic residue containing at least one carbon six-membered ring such as

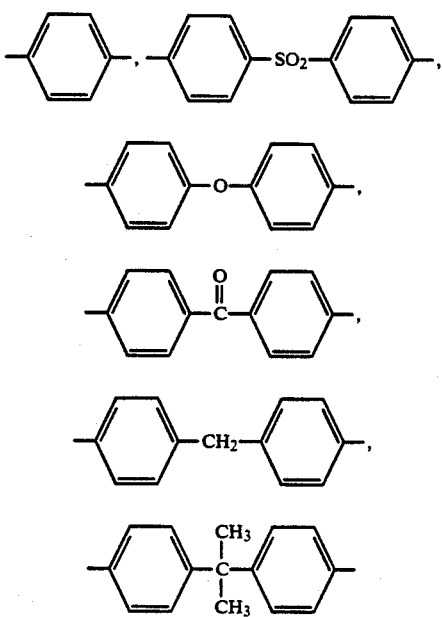

Furthermore, the above-mentioned aromatic ring may have a substituent such as F, Cl, Br or CH.

The particularly typical polyarylene sulfide is polyphenylene sulfide (hereinafter referred to as "PPS") represented by the general formula:

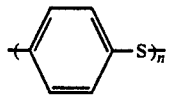

A method for preparing PPS is disclosed in Japanese Patent Publication No. 54-3368. That is, PPS may be prepared by reacting paradichlorobenzene with sodium sulfide at a temperature of 160° to 250° C. under pressure in an N-methylpiloridone solution.

The polyarylate resin used in the present invention is a polyester obtained by a bisphenol and terephthalic acid and/or isophthalic acid. This kind of polyester can be represented by the formula

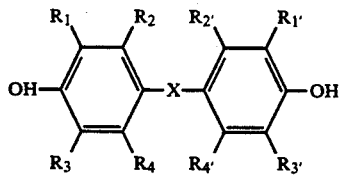

(wherein X is selected from the group consisting of —O—, —S—, —SO$_2$—, —CO— and a hydrocarbon group having 1 to 10 carbon atoms, and each of $R_1$ to $R_4$, $R_{1'}$, $R_{2'}$, $R_{3'}$ and $R_{4'}$ is a group selected from the group consisting of a hydrogen atom, a halogen atom and a hydrocarbon atom). When X is a hydrocarbon group having 1 to 10 carbon atoms, examples of the hydrocarbon group include alkylene groups, branched alkyl groups and halogen-substituted alkyl groups. Examples of the preferable hydrocarbon group include methylene, ethylene, propylene, butylene, isopropylidene, cyclohexylmethylene and chloroethylene, and the more preferable hydrocarbon group is an isopropylidene group. When $R_1$ to $R_4$, $R_{1'}$, $R_{2'}$, $R_{3'}$ and $R_{4'}$ are hydrocarbons, preferable examples of the hydrocarbons include alkyl groups, particularly preferably lower alkyl groups. Examples of the above-mentioned bisphenol include 4,4'-dihydroxydiphenyl ether, 4,4'-dihydroxy-2,2'-dimethyldiphenyl ether, 4,4'-dihydroxy-3,3'-dichlorodiphenyl ether, 4,4'-dihydroxydiphenyl sulfide, 4,4'-dihydroxydiphenyl sulfone, 4,4'-dihydroxydiphenyl ketone, 4,4'-dihydroxydiphenylmethane, 1,2-bis(4'-hydroxyphenyl)ethane, 2,2'-bis(4'-hydroxyphenyl)propane, 1,4-bis(4'-hydroxyphenyl) n-butane, bis(4'-hydroxyphenyl)cyclohexylmethane, 1,2-bis(4'-hydroxyphenyl)-1 and 1,2-trichloroethane. Above all, 2,3-bis(4'-hydroxyphenyl)propane, i.e., bisphenol A or 4,4'-dihydroxyphenyl sulfone, i.e., bisphenol S is most preferable. On the other hand, terephthalic acid and isophthalic acid are used singly or in combination.

The polyarylate resin can be obtained by polymerizing the bisphenol and terephthalic acid and/or isophthalic acid by any polymerization process of a usual interfacial polymerization, a solution polymerization and a melt polymerization.

The above-mentioned polyarylate resin preferably has a molecular weight of from 5,000 to 70,000.

The acid group-containing olefin polymer or copolymer in the multi-phase structure thermoplastic resin used in the present invention is a copolymer of an olefin and an unsaturated carboxylic acid monomer or its derivative by a high-pressure radical polymerization as one example, or a terpolymer of an olefin, an unsaturated carboxylic acid monomer or its derivative and another unsaturated monomer, or a multicomponent copolymer. The particularly preferable olefin for the copolymer is ethylene, and the preferable copolymer comprises 60 to 99.5% by weight of ethylene, 0.5 to 40% by weight of the unsaturated carboxylic acid monomer or its derivative and 0 to 39.5% by weight of another unsaturated monomer.

Examples of the unsaturated carboxylic acid monomer or its derivative include acrylic acid, methacrylic acid, maleic acid, fumaric acid, itaconic acid, crotonic acid, maleic acid monoester, fumaric acid monoester, metallic salts thereof, maleic anhydride and itaconic anhydride.

Other examples of the unsaturated monomer include olefins, vinyl esters and α,β-ethylenic unsaturated carboxylic acid alkyl esters. Typical examples of such unsaturated monomers include olefins such as propylene, butene-1, hexene-1, decene-1 and octene-1, an aromatic vinyl compound such as styrene, vinyl esters such as vinyl acetate, vinyl propionate and vinyl benzoate, esters such as methyl, ethyl, propyl, butyl, 2-ethylhexyl, cyclohexyl, dodecyl and octadecyl acrylates and methacrylates, α,β-ethylenic unsaturated carboxylic acid alkyl esters such as diesters of maleic acid, itaconic acid, fumaric acid and the like, vinyl ethers such as vinyl chloride, vinyl methyl ether and vinyl ethyl ether, and acrylic amide compounds.

Typical examples of the acid group-containing olefin polymer and copolymer include ethylene/maleic acid copolymer, ethylene/maleic anhydride copolymer, ethylene/acrylic acid copolymer, ethylene/methacrylic acid copolymer, ethylene/ethyl acrylate/maleic acid copolymer, ethylene/ethyl acrylate/maleic anhydride copolymer, ethylene/ethyl acrylate/acrylic acid copolymer, ethylene/ethyl acrylate/methacrylic acid copolymer, ethylene/butyl acrylate/maleic anhydride copolymer, ethylene/butyl acrylate/acrylic acid copolymer, ethylene/butyl acrylate/methacrylic acid copolymer, ethylene/vinyl acetate/maleic anhydride copolymer and ethylene/methyl methacrylate/maleic anhydride copolymer. These acid group-containing olefin polymers and copolymers can be used in the form of a mixture thereof.

The acid group-containing olefin polymer or copolymer may be prepared by a high-pressure radical polymerization, i.e., by simultaneously or stepwise contacting and polymerizing a monomer mixture of 60 to 99.5% by weight of the above-mentioned ethylene, 0.5 to 40% by weight of one or more unsaturated carboxylic acid group-containing monomer or its derivative, and 0 to 39.5% by weight of at least one other unsaturated monomer in the presence of 0.0001 to 1% by weight of a radical polymerization initiator based on the total weight of all the monomers at a polymerization pressure of from 500 to 4,000 kg/cm$^2$, preferably from 1,000 to 3,500 kg/cm$^2$, at a reaction temperature of from 50° to 400° C., preferably from 100° to 350° C. by the use of a chain transfer agent and, if necessary, some auxiliaries in a tanklike reactor or a tubular reactor.

Examples of the above-mentioned radical polymerization initiator include usual initiators such as peroxides, hydroperoxides, azo-compounds, amine oxide compounds and oxygen.

Examples of the chain transfer agent include hydrogen, propylene, butene-1, saturated aliphatic hydrocarbons having 1 to 20 carbon atoms such as methane, ethane, propane, butane, isobutane, n-hexane, n-heptane and cycloparaffins, chloroform and carbon tetrachloride, saturated aliphatic alcohols having 1 to 20 or more carbon atoms such as methanol, ethanol, propanol and isopropanol, saturated aliphatic carbonyl compounds having 1 to 20 or more carbon atoms such as carbon dioxide, acetone and methyl ethyl ketone, and aromatic compounds such as toluene, diethylbenzene and xylene.

Another example of the acid group-containing olefin polymer or copolymer used in the present invention is a modified compound prepared by adding the above-mentioned unsaturated carboxylic acid monomer or its derivative to a conventional olefin homopolymer or copolymer.

Examples of the above-mentioned olefin polymer include homopolymers such as low-density, medium-density and high-density polyethylenes, polypropylene, polybutene-1 and poly-4-methylpentene-1, copolymers of ethylene of the main component and other α-olefins such as ethylene-propylene copolymer, ethylene-butene-1 copolymer, ethylene-hexene-1 copolymer, ethylene-4-methylpentene-1 copolymer and ethylene-octene-1 copolymer, a copolymer of propylene of the main component and another α-olefin such as propylene-ethylene block copolymer, ethylene-vinyl acetate copolymer, polymers of ethylene and methyl, ethyl, propyl, isopropyl, butyl and glycidyl acrylate and methacrylate, ethylene-propylene copolymer rubber, ethylene-propylene-dienecopolymer rubber, liquid polybutadiene, ethylene-vinyl acetate-vinyl chloride copolymer, mixtures thereof, and mixtures of these polymers and different kinds of synthetic resins or rubbers.

Typical examples of the vinyl polymer and copolymer in the multi-phase structure thermoplastic resin used in the present invention include polymers and copolymers prepared by polymerizing one or more of vinyl monomers such as vinyl aromatic monomers, for example, styrene, nucleus-substituted styrenes such as methylstyrene, dimethylstyrene, ethylstyrene, isopropylstyrene and chlorostyrene, and α-substituted styrenes, for example, vinyl aromatic monomers such as α-methylstyrene and α-ethylstyrene, acrylate and methacrylate monomers, for example, alkyl esters having 1 to 7 carbon atoms of acrylic acid or methacrylic acid such as methyl, ethyl, propyl, isopropyl, butyl and glycidyl acrylate and methacrylate, acrylonitrile and methacrylonitrile monomers, vinyl ester monomers such as vinyl acetate and vinyl propionate, acrylamide and methacrylamide monomers, and monoesters and diesters of maleic anhydride and maleic acid. Above all, particularly preferable are the vinyl aromatic monomers, acrylate and methacrylate monomers, acrylonitrile and methacrylonitrile monomers, and vinyl ester monomers.

In particular, the vinyl polymer and copolymer containing 50% by weight or more of the vinyl aromatic monomer are most preferable for the sake of improving hygroscopicity.

The multi-phase structure thermoplastic resin used in the present invention is an acid group-containing olefin polymer or copolymer, or a vinyl polymer or copolymer matrix in which another vinyl polymer or copolymer, or acid group-containing olefin polymer or copolymer is uniformly dispersed in a spherical form.

The polymer dispersed in the multi-phase structure thermoplastic resin has a particle diameter of 0.001 to 10 μm, preferably 0.01 to 5 μm. When the particle diameter of the dispersed polymer is less than 0.001 μm or is more than 5 μm, the multi-phase structure thermoplastic resin cannot be dispersed sufficiently in the polyamide resin, and in consequence, for example, appearance is poor and the improvement effect of impact resistance is unpreferably insufficient.

The vinyl polymer or copolymer in the multi-phase thermoplastic resin used in the present invention has a number average polymerization degree of 5 to 10,000, preferably 10 to 5,000.

When the number average polymerization degree is less than 5, the impact resistance of the thermoplastic resin composition regarding the present invention can be improved, but heat resistance deteriorates. Conversely, when it is in excess of 10,000, melting viscosity is high, moldability deteriorates, and surface gloss falls off.

The multi-phase thermoplastic resin used in the present invention comprises 5 to 95% by weight, preferably to 90% by weight, of the acid group-containing olefin polymer or copolymer. Therefore, the content of the vinyl polymer or copolymer is from 95 to 5% by weight, preferably from 80 to 10% by weight.

When the acid group-containing olefin polymer or copolymer is less than 5% by weight, the improvement effect of impact resistance is insufficient. When it is more than 95% by weight, heat resistance deteriorates, though the improvement effect of impact resistance can be obtained sufficiently.

As a grafting technique used to prepare the multi-phase structure thermoplastic resin regarding the present invention, there may be employed a well known process such as a chain transfer process or an ionizing radiation process, but the following process is most preferable, because grafting efficiency is high, secondary cohesion due to heat does not occur, and thus performance can be exerted effectively.

Now, a method for preparing the thermoplastic resin composition of the present invention will be described in detail.

That is, water is suspended in 100 parts by weight of the acid group-containing olefin polymer or copolymer. Afterward, 5 to 400 parts by weight of at least one vinyl monomer is added to the suspension, and in the resulting mixture, a solution is then poured in which there are dissolved 0.1 to 10 parts by weight, based on 100 parts by weight of the vinyl monomer, of one or a mixture of radical polymerizable or copolymerizable organic peroxides represented by the undermentioned general formula (a) or (b) and 0.01 to 5 parts by weight, based on 100 parts by weight of the total of the vinyl monomer and the radical polymerizable or copolymerizable organic peroxide, of a radical polymerization initiator whose decomposition temperature to obtain a half-life period of 10 hours is from 40 to 90° C. The mixture is then heated under conditions that the decomposition of the radical polymerization initiator does not occur substantially, in order to impregnate the acid-modified olefin polymer or copolymer with the vinyl monomer, the radical polymerizable or copolymerizable organic peroxide and the radical polymerization initiator. When the impregnation ratio has reached 50% by weight or more of the original total weight of the monomer, the peroxide and the initiator, the temperature of this aqueous suspension is raised to copolymerize the vinyl monomer with the radical polymerizable or copolymerizable organic peroxide in the acid group-containing olefin polymer or copolymer, thereby obtaining a graft polymerization precursor (A). This graft polymerization precursor also is the multi-phase structure thermoplastic resin. Therefore, this graft polymerization precursor (A) may be directly mixed under melting with the polyamide resin and/or at least one resin selected from the group consisting of polyphenylene ether resins, aromatic polyester resins, polycarbonate resins, polyoxymethylene resins, ABS resins, polyarylene sulfide resins and polyarylate resins.

Furthermore, the multi-phase structure thermoplastic resin regarding the present invention may be prepared by kneading the graft polymerization precursor (A) under melting at a temperature of from 100° to 300° C. At this time, the graft polymerization precursor may be kneaded under melting with the acid group-containing olefin polymer or copolymer (B), or vinyl polymer or copolymer (C) so as to obtain the multi-phase structure thermoplastic resin. What is most preferable is the multi-phase structure thermoplastic resin obtained by kneading the graft polymerization precursor.

The above-mentioned radical polymerizable or copolymerizable organic peroxides are compounds represented by the general formulae (a) and (b):

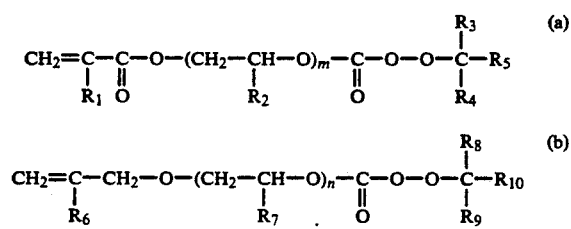

(wherein $R_1$ is a hydrogen atom or an alkyl group having 1 or 2 carbon atoms, each of $R_2$ and $R_7$ is a hydrogen atom or a methyl group, $R_6$ is a hydrogen atom or an alkyl group having 1 to 4 carbon atoms, each of $R_3$, $R_4$, $R_8$ and $R_9$ is an alkyl group having 1 to 4 carbon atoms, each of $R_5$ and $R_{10}$ is an alkyl group having 1 to 12 carbon atoms, a phenyl group, an alkyl-substituted phenyl group or a cycloalkyl group having 3 to 12 carbon atoms, m is 1 or 2, and n is 0, 1 or 2).

Typical examples of the radical polymerizable or copolymerizable organic peroxides represented by the general formula (a) include t-butylperoxyacryloyloxyethyl carbonate, t-amylperoxyacryloyloxyethyl carbonate, t-hexylperoxyacryloyloxyethyl carbonate, 1,1,3,3-tetramethylbutylperoxyacryloyloxyethyl carbonate, cumylperoxyacryloyloxyethyl carbonate, p-isopropylcumylperoxyacryloyloxyethyl carbonate, t-butylperoxymethacryloyloxyethyl carbonate, t-amylperoxymethacryloyloxyethyl carbonate, t-hexylperoxymethacryloyloxyethyl carbonate, 1,1,3,3-tetramethylbutylperoxymethacryloyloxyethyl carbonate, cumylperoxymethacryloyloxyethyl carbonate, p-isopropylcumylperoxymethacryloyloxyethyl carbonate, t-butylperoxyacryloyloxyethoxyethyl carbonate, t-amylperoxyacryloyloxyethoxyethyl carbonate, t-hexylperoxyacryloyloxyethoxyethyl carbonate, 1,1,3,3-tetramethylbutylperoxyacryloyloxyethoxyethyl carbonate, cumylperoxyacryloyloxyethoxyethyl carbonate, p-isopropylcumylperoxyacryloyloxyethoxyethyl carbonate, t-butylperoxymethacryloyloxyethoxyethyl carbonate, t-amylperoxymethacryloyloxyethoxyethyl carbonate, t-hexylperoxymethacryloyloxyethoxyethyl carbonate, 1,1,3,3-tetramethylbutylperoxymethacryloyloxyethoxyethyl carbonate, cumylperoxymethacryloyloxyethoxyethyl carbonate, p-isopropylcumylperoxymethacryloyloxyethyl carbonate, t-butylperoxyacryloyloxyisopropyl carbonate, t-amylperoxyacryloyloxyisopropyl carbonate, t-hexylperoxyacryloyloxyisopropyl carbonate, 1,1,3,3-tetramethylbutylperoxyacryloyloxyisopropyl carbonate, cumylperoxyacryloyloxyisopropyl carbonate, p-isopropylcumylperoxyacryloyloxyisopropyl carbonate, t-butylperoxymethacryloyloxyisopropyl carbonate, t-amylperoxymethacryloyloxyisopropyl carbonate, t-hexylperoxymethacryloyloxyisopropyl carbonate, 1,1,3,3-tetramethylbutylperoxymethacryloyloxyisopropyl carbonate, cumylperoxymethacryloyloxyisopropyl carbonate and p-isopropylcumylperoxymethacryloyloxyisopropyl carbonate.

Typical examples of the compounds represented by the general formula (b) include t-butylperoxyallyl carbonate, t-amylperoxyallyl carbonate, t-hexylperoxyallyl carbonate, 1,1,3,3-tetramethylbutylperoxyallyl carbonate, p-menthaneperoxyallyl carbonate, cumylperoxyallyl carbonate, t-butylperoxymethallyl carbonate, t-amylperoxymethallyl carbonate, t-hexylperoxymethallyl carbonate, 1,1,3,3-tetramethylbutylperoxymethallyl carbonate, p-menthaneperoxymethallyl carbonate, cumylperoxymethallyl carbonate, t-butylperoxyallyloxyethyl carbonate, t-amylperoxyallyloxyethyl carbonate, t-hexylperoxyallyloxyethyl carbonate, t-butylperoxymethallyloxyethyl carbonate, t-amylperoxymethallyloxyethyl carbonate, t-hexylperoxymethallyloxyethyl carbonate, t-butylperoxyallyloxyisopropyl carbonate, t-amylperoxyallyloxyisopropyl carbonate, t-hexylperoxyallyloxyisopropyl carbonate, t-butylperoxymethallyloxyisopropyl carbonate, t-amylperoxymethallyloxyisopropyl carbonate and t-hexylperoxymethallyloxyisopropyl carbonate.

Of these compounds, preferable ones are t-butylperoxyacryloyloxyethyl carbonate, t-butylperoxymethacryloyloxyethyl carbonate, t-butylperoxyallyl carbonate and t-butylperoxymethallyl carbonate.

In the present invention, 99 to 1% by weight, preferably 90 to 10% by weight of the polyamide resin is blended with 1 to 99% by weight, preferably 10 to 90% by weight of at least one resin selected from the group consisting of a polyphenylene ether resin, an aromatic polyester resin, a polycarbonate resin, a polyoxymethylene resin, an ABS resin, a polyarylene sulfide resin and a polyarylate resin. When the amount of the polyamide resin is in excess of 99% by weight, improvement effects of heat resistance and hygroscopicity are insufficient, and when it is less than 1% by weight, improvement effects of oil resistance and moldability are not perceived.

The multi-phase structure thermoplastic resin of the present invention is used in an amount of 0.1 to 100 parts by weight, preferably 1 to 50 parts by weight based on 100 parts by weight of the resins (I)+(II).

When the amount of the multi-phase structure thermoplastic resin is less than 0.1 part by weight, molded articles obtained therefrom exhibit delamination, and when it is more than 100 parts by weight, heat resistance deteriorates.

In the present invention, an inorganic filler can be used in an amount of 0 to 150 parts by weight based on 100 parts of the resin components (I) +(II) +(III).

The inorganic filler may be used in granular, lamellar, scaly, needle, spherical, balloons and fibrous forms, and examples of these inorganic fillers include lamellar and scaly fillers such as calcium sulfate, calcium silicate, clay, diatomaceous earth, talc, alumina, siliceous sand, glass powder, iron oxide, metallic powder, graphite, silicon carbide, silicon nitride, silica, boron nitride, aluminum nitride and carbon black; lamellar and scaly fillers such as mica, glass plate, sericite, pyrophyllite, metallic foil, for example, aluminum flake, and graphite; balloon fillers such as Shirasu balloon, metallic balloon, glass balloon and pumice; and mineral fibers such as glass fiber, carbon fiber, graphite fiber, whisker, metallic fiber, silicon carbide fiber, asbestos and wollastonite.

When the content of the filler is in excess of 150 parts by weight, the impact strength of molded articles deteriorates unpreferably.

The surface of the inorganic filler is preferably treated by the use of stearic acid, oleic acid, palmitic acid or a metallic salt thereof, paraffin wax, polyethylene wax or a modified material thereof, an organic silane, an organic borane or an organic titanate.

The thermoplastic composition of the present invention can be prepared by melting/mixing the above-mentioned resin components at a temperature of from 150° to 350° C., preferably from 180° to 330° C. When this temperature is less than 150° C., the melting is incomplete, melting viscosity is high, and the mixing is insufficient. In consequence, phase separation and delamination take place unpreferably on molded articles. Conversely when it is in excess of 350° C., the resins to be mixed tend to decompose or gel.

With regard to the order of the melting/mixing of the respective components, all of them may be melted/mixed simultaneously, or alternatively, in a preferable case, the multi-phase structure thermoplastic resin (III) is first mixed with either of the polyamide resin (I) and at least one resin (II) selected from the group consisting of the polyphenylene ether resin, the aromatic polyester resin, the polycarbonate resin, the polyoxymethylene resin, the ABS resin, the polyarylene sulfide resin and the polyarylate resin, and the resulting mixture is further melted/mixed with the other resin.

In melting and mixing, there may be used a usual kneader such as a Banbury's mixer, a pressing kneader, a kneading extruder, a twin-screw extruder or rolls.

In the present invention, the following materials can be additionally used, in so far as they do not deviate from the gist of the present invention. Examples of such materials include an inorganic flame retardant such as magnesium hydroxide or aluminum hydroxide, an organic flame retardant containing a halogen, phosphorus or the like, an organic filler such as wood meal, and additives such as an antioxidant, an ultraviolet inhibitor, a lubricant, a dispersant, a coupling agent, a foaming agent, a crosslinking agent and a colorant, and other polyolefin resin, vinyl resin, natural rubber, synthetic rubber and engineering plastics.

Now, the present invention will be described in detail in reference to examples.

REFERENCE EXAMPLE 1

Preparation of Multi-phase Structure Thermoplastic Resin A

In a 5-liter stainless steel autoclave was placed 2,500 g of pure water, and 2.5 g of polyvinyl alcohol was further dissolved therein as a suspending agent. To the solution was added 700 g of ethylene (76% by weight)/ethyl acrylate (21% by weight)/maleic anhydride (3% by weight) copolymer as an acid group-containing olefin polymer or copolymer, followed by stirring to suspend the same therein. Separately, in 300 g of styrene as a vinyl monomer were dissolved 1.5 g of benzoyl-peroxide as a radical polymerization initiator (trade name Nyper-B; made by Nippon Oils & Fats Co., Ltd.) and 6 g of t-butylperoxymethacryloyloxyethyl carbonate as a radical polymerizable or copolymerizable organic peroxide, and the resulting solution was then placed in the above-mentioned autoclave, followed by stirring.

Afterward, the autoclave was heated up to a temperature of 60° to 65° C., and stirring was then continued for 2 hours, so that the acid group-containing olefin copolymer was impregnated with the vinyl monomer containing the radical polymerization initiator and the radical polymerizable or copolymerizable organic peroxide. After it had been confirmed that the total amount of the impregnated vinyl monomer, radical polymerizable or copolymerizable organic peroxide and radical polymerization initiator was 50% by weight or more of the original total weight thereof, the temperature of the mixture was raised up to a level of 80° to 85° C., and this temperature was then maintained for 7 hours to complete polymerization, followed by water washing and drying, thereby obtaining a graft polymerization precursor. A styrene polymer was extracted from this graft polymerization precursor with ethyl acetate, and according to measurement by the use of GPC, the number average polymerization degree of the styrene polymer was 900.

Next, this graft polymerization precursor was extruded at 200° C. by a single screw extruder (trade name "Labo" plasto-mill; made by Toyo Seiki Seisaku-sho Ltd.) to perform the grafting reaction, whereby a multi-phase structure thermoplastic resin A was obtained.

This multi-phase structure thermoplastic resin was then observed by a scanning electron microscope (trade name JEOL JSM T300; made by JEOL, Ltd.), and it was found that the resin was a multi-phase structure thermoplastic resin in which spherical resin particles each having a diameter of 0.3 to 0.4 μm were uniformly dispersed.

In this case, the grafting efficiency of the styrene polymer was 75.2% by weight.

REFERENCE EXAMPLE 2
Preparation of Multi-phase Structure Thermoplastic Resin B The same procedure as in Reference Example 1 was repeated with the exception that 300 g of styrene as a vinyl monomer was replaced with 300 g of methyl methacrylate and that 0.6 g of n-dodecyl mercaptan was used as a molecular weight modifier, in order to prepare a multi-phase structure thermoplastic resin B.

In this case, the number average polymerization degree of the methyl methacrylate polymer was 700, and the average particle diameter of the resin dispersed in the resin composition was from 0.1 to 0.2 μm.

REFERENCE EXAMPLE 3
Preparation of Multi-phase Structure Thermoplastic Resin C The same procedure as in Reference Example 1 was repeated with the exception that 300 g of styrene as a vinyl monomer was replaced with 210 g of a styrene monomer and 90 g of an acrylonitrile monomer, that 1.5 g of benzoyl peroxide was replaced with 3 g of di-3,5,5-trimethylhexanoyl peroxide (trade name Perloyl 355; made by Nippon Oils & Fats Co., Ltd.), and that 0.3 g of α-methylstyrene dimer (trade name Nofmar MDS; made by Nippon Oils & Fats Co., Ltd.) was used as a molecular weight modifier, thereby preparing a multi-phase structure thermoplastic resin C.

In this case, the number average polymerization degree of the styrene polymer was 1,200, and the average particle diameter of the resin dispersed in the resin composition was from 0.3 to 0.4 μm.

EXAMPLES 1 TO 6

6,6-Nylon (I) (trade name Amiran CM 3001-N; made by Toray Industries, Inc.) (which is represented by PA in Table 1), poly-2,6-dimethyl-1,4-phenylene ether (which is represented by PPE in Table 1) (intrinsic viscosity 0.31) and the multi-phase structure thermoplastic resin A obtained in Reference Example 1 were melted/mixed in a ratio shown in Table 1.

The melting/mixing process was carried out by dry-blending the respective resin pellets and then feeding them into a one-directional twin-screw extruder having a cylinder temperature of 280° C. and a screw diameter of 30 mm. Afterward, extrusion and the formation of granules followed. The latter were then dried at 150° C. for 3 hours and then treated by an injection molding machine having a cylinder temperature of 320° C. and a mold temperature of 90° C. in order to prepare specimens.

Sizes of the specimens were as follows:

| | |
|---|---|
| Specimens for notched Izod impact strength | 13 × 65 × 6 mm |
| Specimens for heat distortion temperature | 13 × 130 × 6 mm |
| Specimens for tensile strength | 13 × 220 × 6 mm |
| Specimens for flexural modulus | 10 × 130 × 4 mm |

Procedures for the respective tests were as follows:

| | |
|---|---|
| (1) Notched Izod impact strength: | JIS K7110 |
| (2) Heat distortion temperature: | JIS K7207 |
| (3) Tensile yield elongation: | JIS K7113 |
| (4) Flexural modulus: | JIS K6758 |
| (5) Appearance of molded articles | |

The appearance of molded articles was ranked by observing a flow mark and the state of gloss, as follows:
(a) Flow mark:
⊚: No flow mark was present.
O: The flow mark was slightly present.
X: The flow mark was present.
(b) State of gloss:
⊚: The gloss was excellent.
O: The gloss was good.
X: The gloss was poor.
(6) State of delamination:
First, a friction pull test was carried out by sticking an adhesive tape on the broken surface of each molded article, and then peeling the adhesive tape therefrom. Afterward, the state of the broken surface was visually observed, and then ranked as follows:
⊚: No delamination was present.
O: The delamination was slightly present.
X: The delamination was present.
(7) Gasoline resistance:
A gasoline resistance test was carried out by immersing a specimen in gasoline at 25° C. for 1.5 hours, and then observing cracks on the specimen.
⊚: No cracks were present.
X: The cracks were present.

TABLE 1

| | Example No. | | | | | |
|---|---|---|---|---|---|---|
| | 1 | 2 | 3 | 4 | 5 | 6 |
| PA (wt %) | 70 | 70 | 70 | 50 | 40 | 40 |
| PPE (wt %) | 30 | 30 | 30 | 50 | 60 | 60 |
| Multi-phase Structure Thermoplastic Resin (A) (pts. wt.)* | 5 | 10 | 20 | 10 | 10 | 20 |
| Notched Izod Impact Strength (kg × cm/cm) | 15 | 25 | 28 | 20 | 20 | 25 |
| Heat Distortion Temperature (°C.) (18.6 kg/cm²) | 145 | 141 | 145 | 155 | 164 | 160 |
| Tensile Yield Elongation (%) | 95 | 100 | 150 | 100 | 110 | 110 |
| Appearance of Molded Article (flow mark) | ⊚ | ⊚ | ⊚ | ⊚ | O | ⊚ |
| Appearance of Molded Article (gloss) | ⊚ | ⊚ | ⊚ | ⊚ | ⊚ | ⊚ |
| Delamination | O | ⊚ | ⊚ | ⊚ | ⊚ | ⊚ |
| Gasoline Resistance | ⊚ | ⊚ | ⊚ | ⊚ | ⊚ | ⊚ |

*)Parts by weight based on 100 parts by weight of the (PA + PPE) resins.

EXAMPLES 7 TO 9

The same procedure as in Example 1 was effected except that the graft polymerization precursor obtained in Reference Example 1 was used, and evaluation was then made as in Example 1. The results are set forth in Table 2.

TABLE 2

| | Example No. | | |
|---|---|---|---|
| | 7 | 8 | 9 |
| PA (wt %) | 70 | 50 | 40 |

TABLE 2-continued

|  | Example No. | | |
| --- | --- | --- | --- |
|  | 7 | 8 | 9 |
| PPE (wt %) | 30 | 50 | 60 |
| Multi-phase Structure Thermoplastic Resin (A) (pts. wt.)* | 10 | 10 | 20 |
| Notched Izod Impact Strength (kg × cm/cm) | 22 | 20 | 28 |
| Heat Distortion Temperature (°C.) (18.6 kg/cm²) | 130 | 149 | 163 |
| Tensile Yield Elongation (%) | 95 | 100 | 100 |
| Appearance of Molded Article (flow mark) | ⊚ | ⊚ | ⊚ |
| Appearance of Molded Article (gloss) | ⊚ | ⊚ | ⊚ |
| Delamination | ⊚ | ⊚ | ⊚ |
| Gasoline Resistance | ⊚ | ⊚ | ⊚ |

*)Parts by weight based on 100 parts by weight of the (PA + PPE) resins.

COMPARATIVE EXAMPLES 1 TO 3

The same procedure as in Example 1 was effected except that the multi-phase structure thermoplastic resin in Example 1 was replaced with each of the ethylene/ethyl acrylate/maleic anhydride copolymer (Et/EA/MAN copolymer) and styrene/maleic anhydride copolymer (St/MAN copolymer) used in Reference Example 1, and evaluation was then made as in Example 1. The results are set forth in Table 3.

TABLE 3

|  | Comp. Ex. No. | | |
| --- | --- | --- | --- |
|  | 1 | 2 | 3 |
| PA (wt %) | 70 | 70 | 70 |
| PPE (wt %) | 30 | 30 | 30 |
| Et/EA/MAN Copolymer (pts. wt.)* | — | 20 | — |
| St/MAN Copolymer (pts. wt.)* | — | — | 20 |
| Notched Izod Impact Strength (kg × cm/cm) | 5 | 12 | 8 |
| Heat Distortion Temperature (°C.) (18.6 kg/cm²) | 105 | 105 | 120 |
| Tensile Yield Elongation (%) | 70 | 140 | 100 |
| Appearance of Molded Article (flow mark) | X | X | ⊚ |
| Appearance of Molded Article (gloss) | X | ⊚ | ○ |
| Delamination | X | ⊚ | ○ |
| Gasoline Resistance | X | ⊚ | ⊚ |

*)Parts by weight based on 100 parts by weight of the (PA + PPE) resins.

EXAMPLES 10 TO 15

The same procedure as in Example 1 was effected except that the multi-phase structure thermoplastic resin used in Example 1, the graft polymerization precursor used in Example 7 and a glass fiber (average fiber length 0.3 mm×diameter 10 μm as an inorganic filler were mixed in ratios shown in Table 4 based on 100 parts by weight of the above-mentioned resins, and evaluation was then made as in Example 1. The results are set forth in Table 4.

TABLE 4

|  | Example No. | | | | | |
| --- | --- | --- | --- | --- | --- | --- |
|  | 10 | 11 | 12 | 13 | 14 | 15 |
| PA (wt %) | 70 | 70 | 70 | 40 | 40 | 40 |
| PPE (wt %) | 30 | 30 | 30 | 60 | 60 | 60 |
| Multi-phase Structure Thermoplastic Resin A (wt %) 1) | 15 | 15 | — | 15 | 15 | — |
| Graft Polymerization Precursor A (wt %) 1) | — | — | 15 | — | — | 15 |
| Glass Fiber (wt %) 2) | 20 | 30 | 20 | 20 | 30 | 30 |
| Notched Izod Impact Strength (kg × cm/cm) | 8 | 10 | 10 | 10 | 9 | 12 |
| Heat Distortion Temperature (°C.) (18.6 kg/cm²) | 200 | 225 | 200 | 220 | 230 | 225 |
| Tensile Yield Elongation (%) | 12 | 10 | 10 | 18 | 10 | 10 |
| Appearance of Molded Article (flow mark) | ⊚ | ⊚ | ⊚ | ⊚ | ○ | ⊚ |
| Appearance of Molded Article (gloss) | ⊚ | ⊚ | ⊚ | ⊚ | ⊚ | ⊚ |
| Delamination | ○ | ⊚ | ⊚ | ⊚ | ⊚ | ⊚ |
| Gasoline Resistance | ⊚ | ⊚ | ⊚ | ⊚ | ⊚ | ⊚ |

1) Parts by weight based on 100 parts by weight of the (PA + PPE) resins.
2) Parts by weight based on 100 parts by weight of the (PA + PPE + compatibilizing agent) resins.

EXAMPLES 16 TO 26

The same procedure as in Example 1 was effected except that PPE in Example 1 was replaced with an ABS resin having a composition shown in Table 5 or a polycarbonate resin (PC) having a number average molecular weight of 62,000, that the multi-phase structure thermoplastic resin A obtained in Reference Example 1 was replaced with the multi-phase structure thermoplastic resin C obtained in Reference Example 3, and that the raw materials were melted and mixed in ratios shown in Table 6.

The melting/mixing process was carried out by feeding the raw materials into a one-directional twin-screw extruder having a cylinder temperature of 250° C. and a screw diameter of 30 mm. Afterward, extrusion and the formation of granules followed. The latter were then dried at 150° C. for 3 hours and then treated by an injection molding machine in order to prepare specimens.

Specimens and test procedures for notched Izod impact strength and heat distortion temperature were the same as in Example 1.

Chemical resistance was evaluated by first immersing each specimen in methanol at 75° C. for 30 days, and then observing the appearance of the specimen. The evaluation was graded as follows:

O: No change
Δ: Cracks occurred on the surface of the specimen and the latter was partially dissolved out.
X: The surface was noticeably dissolved out.

Furthermore, inspection was made as to whether or not the resin was peeled in the form of a layer from the broken portion of the specimen in order to evaluate compatibility.

TABLE 5

| Composition of Specimen | ABS Resin (1) | ABS Resin (2) |
| --- | --- | --- |
| Acrylonitrile (pts. wt.) | 20 | 25 |
| Styrene (pts. wt.) | 55 | 15 |
| α-Methylstyrene (pts. wt.) | 0 | 40 |
| Polybutadiene (pts. wt.) | 25 | 20 |

TABLE 5-continued

| Composition of Specimen | ABS Resin (1) | ABS Resin (2) |
|---|---|---|
| Inherent Viscosity | 0.60 | 0.65 |

TABLE 6

| | Example No. | | | | | | | | | | |
|---|---|---|---|---|---|---|---|---|---|---|---|
| | 16 | 17 | 18 | 19 | 20 | 21 | 22 | 23 | 24 | 25 | 26 |
| PA (wt %) | 20 | 25 | 25 | 25 | 50 | 50 | 50 | 50 | 80 | 80 | 80 |
| ABS (1) (wt %) | — | 75 | 75 | — | 50 | 50 | — | — | 20 | — | — |
| ABS (2) (wt %) | — | — | — | 75 | — | — | 50 | — | — | 20 | — |
| PC (wt %) | 80 | — | — | — | — | — | — | 50 | — | — | 20 |
| Multi-phase Structure Thermoplastic Resin C (wt %) *) | 10 | 10 | 20 | 20 | 10 | 20 | 20 | 20 | 20 | 20 | 20 |
| Notched Izod Impact Strength (kg · cm/cm) | 80 | 22 | 25 | 23 | 18 | 20 | 20 | 55 | 17 | 15 | 35 |
| Heat Distortion Temperature (°C.) (18.6 kg/cm$^2$) | 142 | 115 | 122 | 139 | 133 | 131 | 135 | 140 | 129 | 134 | 140 |
| Chemical Resistance (appearance) | O | O | O | O | O | O | O | O | O | O | O |
| Delamination | none | none | none | none | none | none | none | none | none | none | none |

*) Parts by weight based on 100 parts by weight of the (PA + ABS or PC) resins.

EXAMPLES 27 TO 33

The same procedure as in Example 16 was effected except that the grafted multi-phase structure thermoplastic resin C in Example 16 was replaced with the graft polymerization precursor C obtained in Reference Example 3. The results are set forth in Table 7. Also in this case, the same effect as in the grafted multi-phase structure thermoplastic resin C was exhibited.

TABLE 7

| | Example No. | | | | | | |
|---|---|---|---|---|---|---|---|
| | 27 | 28 | 29 | 30 | 31 | 32 | 33 |
| PA (wt %) | 25 | 50 | 50 | 50 | 80 | 80 | 80 |
| ABS (1) (wt %) | 75 | 50 | — | — | 20 | — | — |
| ABS (2) (wt %) | — | — | 50 | — | — | 20 | — |
| PC (wt %) | — | — | — | 50 | — | — | 20 |
| Graft Polymerization Precursor C (wt %) *) | 20 | 20 | 20 | 20 | 20 | 20 | 20 |
| Notched Izod Impact Strength (kg · cm/cm) | 20 | 22 | 20 | 41 | 18 | 18 | 30 |
| Heat Distortion Temperature (°C.) (18.6 kg/cm$^2$) | 118 | 120 | 122 | 139 | 129 | 131 | 140 |
| Chemical Resistance (appearance) | O | O | O | O | O | O | O |
| Delamination | none | none | none | none | none | none | none |

*) Parts by weight based on 100 parts by weight of the (PA + ABS or PC) resins.

EXAMPLES 34 TO 41

The multi-phase structure thermoplastic resin used in Example 16, the graft polymerization precursor used in Examples 27 and a glass fiber having an average fiber length of 5.0 mm and a diameter of 10 μm were blended. The results are set forth in Table 8.

TABLE 8

| | Example No. | | | | | | | |
|---|---|---|---|---|---|---|---|---|
| | 34 | 35 | 36 | 37 | 38 | 39 | 40 | 41 |
| PA (wt %) | 30 | 30 | 30 | 30 | 50 | 80 | 80 | 80 |
| ABS (1) (wt %) | 70 | 70 | — | — | 50 | 20 | — | — |
| ABS (2) (wt %) | — | — | 70 | — | — | — | 20 | — |
| PC (wt %) | — | — | — | 70 | — | — | — | 20 |
| Multi-phase Structure Thermoplastic Resin A (pts. wt.) 1) | 20 | — | 20 | 20 | 20 | 20 | — | 20 |
| Grafted Precursor C (pts. wt.) 1) | — | 20 | — | — | — | — | 20 | — |
| Glass Fiber (pts. wt.) 2) | 30 | 30 | 30 | 30 | 30 | 30 | 30 | 30 |
| Notched Izod Impact Strength (kg · cm/cm) | 13 | 12 | 10 | 90 | 10 | 10 | 9 | 60 |
| Heat Distortion Temperature (°C.) (18.6 kg/cm$^2$) | 136 | 135 | 139 | 145 | 165 | 170 | 175 | 195 |
| Chemical Resistance (appearance) | O | O | O | O | O | O | O | O |
| Delamination | none | none | none | none | none | none | none | none |

1) Parts by weight based on 100 parts by weight of the (PA + ABS or PC) resins.
2) Parts by weight based on 100 parts by weight of the (PA + ABS or PC + compatibilizing agent) resins.

COMPARATIVE EXAMPLES 4 TO 11

The multi-phase structure thermoplastic resin used in Examples 16 to 41 was replaced with the ethylene/ethyl acrylate/maleic anhydride copolymer (Et/EA/MAN copolymer) used in the reference example and a modified compound of the ethylene/vinyl acetate copolymer (Et/VAc copolymer). The results are set forth in Table 9.

TABLE 9

| | Comparative Example No. | | | | | | | |
|---|---|---|---|---|---|---|---|---|
| | 4 | 5 | 6 | 7 | 8 | 9 | 10 | 11 |
| PA (wt %) | 30 | 30 | 30 | 40 | 50 | 80 | 80 | 80 |
| ABS (1) (wt %) | 70 | 70 | 70 | — | 50 | 20 | — | — |
| ABS (2) (wt %) | — | — | — | — | — | — | 20 | — |
| PC (wt %) | — | — | — | 60 | — | — | — | 20 |
| Et/EA/MAN Copolymer (pts. wt.) *) | — | — | 20 | 20 | 20 | 20 | — | 20 |
| Modified Compound of Et/VAc Copolymer (pts. wt.) *) | — | 20 | — | — | — | — | 20 | — |
| Notched Izod Impact Strength | 3.5 | 4.2 | 3.9 | 4.1 | 3.0 | 3.2 | 3.0 | 3.8 |

TABLE 9-continued

|  | Comparative Example No. | | | | | | | |
|---|---|---|---|---|---|---|---|---|
|  | 4 | 5 | 6 | 7 | 8 | 9 | 10 | 11 |
| (kg · cm/cm) | | | | | | | | |
| Heat Distortion Temperature (°C.) (18.6 kg/cm$^2$) | 73 | 69 | 80 | 85 | 70 | 77 | 79 | 83 |
| Chemical Resistance (appearance) | X | X | X | X | X | Δ | Δ | Δ |
| Delamination | In all of these comparative examples, delamination was present. | | | | | | | |

*) Parts by weight based on 100 parts by weight of the (PA + ABS or PC) resins.

EXAMPLES 42 TO 47

PPE in Example 1 was replaced with the butylene terephthalate (PBT) having an inherent viscosity of 3.7 dl/g or a polyoxymethylene resin (POM) (trade name Duracon M90; made by Plastics Co., Ltd.), and the multi-phase structure thermoplastic resins A to C obtained in Reference Examples 1 to 3 were each melted and kneaded with the other raw materials in ratios shown in Table 10. Evaluation was made as in Example 1.

TABLE 10

|  | Example No. | | | | | |
|---|---|---|---|---|---|---|
|  | 42 | 43 | 44 | 45 | 46 | 47 |
| PA (wt %) | 70 | 70 | 70 | 50 | 50 | 30 |
| PBT (wt %) | 30 | 30 | — | 50 | — | 70 |
| POM (wt %) | — | — | 30 | — | 50 | — |
| Multi-phase Structure Thermoplastic Resin A (pts. wt.)* | 10 | — | — | — | — | — |
| Multi-phase Structure Thermoplastic Resin B (pts. wt.)* | — | 20 | — | 20 | — | 20 |
| Multi-phase Structure Thermoplastic Resin C (pts. wt.)* | — | — | 20 | — | 20 | — |
| Notched Izod Impact Strength (kg × cm/cm) | 12 | 15 | 13 | 12 | 11 | 10 |
| Heat Distortion Temperature (°C.) (18.6 kg/cm$^2$) | 152 | 165 | 142 | 149 | 133 | 131 |
| Flexural Modulus (kg/mm$^2$) | 245 | 253 | 210 | 234 | 200 | 221 |
| Delamination | none | none | none | none | none | none |

*)Parts by weight based on 100 parts by weight of the [PA + (PBT or POM) resins.

EXAMPLES 48 TO 54

The multi-phase structure thermoplastic resins in Examples 42 to 47 were replaced with the graft polymerization precursors obtained in the reference examples, and a glass fiber having an average fiber length of 5.0 mm and a diameter of 10 μm was additionally blended. The results are set forth in Table 11.

TABLE 11

|  | Example No. | | | | | | |
|---|---|---|---|---|---|---|---|
|  | 48 | 49 | 50 | 51 | 52 | 53 | 54 |
| PA (wt %) | 70 | 70 | 70 | 50 | 50 | 50 | 30 |
| PBT (wt %) | 30 | 30 | — | 50 | 50 | 70 | — |
| POM (wt %) | — | — | 30 | — | — | — | 70 |
| Multi-phase Structure Thermoplastic Resin A (pts. wt.) *) | 20 | — | — | — | — | — | — |
| Multi-phase Structure Thermoplastic Resin B (pts. wt.) *) | — | — | 20 | — | — | — | — |
| Multi-phase Structure Thermoplastic Resin C (pts. wt.) *) | — | 20 | — | — | — | — | — |
| Graft Polymerization Precursor A (pts. wt.) 1) | — | — | — | — | — | — | — |
| Graft Polymerization Precursor B (pts. wt.) 1) | — | — | — | — | 20 | — | — |
| Graft Polymerization Precursor C (pts. wt.) 1) | — | — | — | — | — | — | 20 |
| Glass Fiber (pts. wt.) 2) | 30 | — | 30 | 30 | — | 30 | — |
| Notched Izod Impact Strength (kg · cm/cm) | 9 | 12 | 8 | 9 | 10 | 8 | 9 |
| Heat Distortion Temperature (°C.) (18.6 kg/cm$^2$) | 136 | 135 | 139 | 145 | 165 | 170 | 175 |
| Flexural Modulus (kg/mm$^2$) | 264 | 233 | 242 | 239 | 210 | 237 | 208 |
| Delamination | none | none | none | none | none | none | none |

1) Parts by weight based on 100 parts by weight of the [PA + (PBT or POM)] resins.
2) Parts by weight based on 100 parts by weight of the [PA + (PBT or POM) + compatibilizing agent] resins.

COMPARATIVE EXAMPLES 12 TO 15

The multi-phase structure thermoplastic resins used in Examples 42 to 54 were replaced with ethylene/ethyl acrylate/maleic anhydride. The results are set forth in Table 12.

TABLE 12

|  | Comparative Example No. | | | |
|---|---|---|---|---|
|  | 12 | 13 | 14 | 15 |
| PA (wt %) | 70 | 70 | 50 | 50 |
| PBT (wt %) | 30 | 30 | 50 | — |
| POM (wt %) | — | — | — | 50 |
| Et/EA/MAN Copolymer (pts. wt.)* | — | 20 | 20 | 20 |
| Notched Izod Impact Strength (kg × cm/cm) | 2.1 | 3.1 | 2.9 | 2.5 |
| Heat Distortion Temperature (°C.) (18.6 kg/cm$^2$) | 63 | 67 | 68 | 72 |
| Flexural Modulus (kg/mm$^2$) | 291 | 257 | 264 | 260 |
| Delamination | In all of these comparative examples, delamination was present. | | | |

*)Parts by weight based on 100 parts by weight or the [PA + (PBT or POM)] resins.

EXAMPLES 55 TO 62

PPE in Example 1 was replaced with PPS (trade name Raiton R-4; made by Philips Petroleum Co., Ltd.) or a polyarylate having a reduced viscosity of 0.85 dl/g [which was obtained from bisphenol A, terephthalic acid and isophthalic acid (a ratio of terephthalic acid-/isophthalic acid was 50/50)]. The results are set forth in Table 13.

TABLE 13

|  | Example No. | | | | | | | |
|---|---|---|---|---|---|---|---|---|
|  | 55 | 56 | 57 | 58 | 59 | 60 | 61 | 62 |
| PA (wt %) | 20 | 20 | 20 | 40 | 60 | 60 | 80 | 80 |
| PPS (1) | 80 | 80 | — | 60 | 40 | — | 20 | — |

TABLE 13-continued

|  | Example No. | | | | | | | |
| --- | --- | --- | --- | --- | --- | --- | --- | --- |
|  | 55 | 56 | 57 | 58 | 59 | 60 | 61 | 62 |
| (wt %) | | | | | | | | |
| Polyacrylate (wt %) | — | — | 80 | — | — | 40 | — | 20 |
| Multi-phase Structure Thermoplastic Resin A (wt. %) *) | 10 | — | — | — | 20 | — | — | — |
| Multi-phase Structure Thermoplastic Resin B (wt. %) *) | — | 20 | — | 20 | — | 20 | — | — |
| Notched Izod Impact Strength (kg · cm/cm) | 8 | 9 | 13 | 12 | 12 | 13 | 11 | 12 |
| Heat Distortion Temperature (°C.) (18.6 kg/cm²) | 172 | 185 | 162 | 179 | 198 | 173 | 182 | 167 |
| Delamination | none | none | none | none | none | none | none | none |

1) Parts by weight based on 100 parts by weight of the [PA + (PPS or polyacrylate)] resins.

EXAMPLES 63 TO 70

The multi-phase structure thermoplastic resins in Examples 55 to 62 were replaced with the graft polymerization precursors obtained in the reference examples, and a glass fiber having an average fiber length of 5.0 mm and a diameter of 10 μm was additionally blended. The results are set forth in Table 14.

TABLE 14

|  | Example No. | | | | | | | |
| --- | --- | --- | --- | --- | --- | --- | --- | --- |
|  | 63 | 64 | 65 | 66 | 67 | 68 | 69 | 70 |
| PA (wt %) | 20 | 20 | 20 | 50 | 60 | 60 | 80 | 80 |
| PPS (wt %) | 80 | 80 | — | — | 40 | — | 20 | — |
| Polyacrylate (wt %) | — | — | 80 | 50 | — | 40 | — | 20 |
| Multi-phase Structure Thermoplastic Resin A (wt. %) *) | 15 | — | — | — | 20 | — | 10 | — |
| Multi-phase Structure Thermoplastic Resin B (wt. %) *) | — | — | 20 | 20 | — | 20 | — | — |
| Graft Polymerization Precursor A (pts. wt.) 1) | — | 15 | — | — | — | — | — | — |
| Graft Polymerization Precursor B (pts. wt.) 1) | — | — | — | — | — | — | — | 15 |
| Glass Fiber (pts. wt.) 2) | 30 | — | 30 | 30 | 30 | 30 | 30 | — |
| Notched Izod Impact Strength (kg · cm/cm) | 8 | 9 | 9 | 10 | 10 | 12 | 11 | 12 |
| Heat Distortion Temperature (°C.) (18.6 kg/cm²) | 245 | 183 | 162 | 179 | 238 | 173 | 230 | 164 |

TABLE 14-continued

|  | Example No. | | | | | | | |
| --- | --- | --- | --- | --- | --- | --- | --- | --- |
|  | 63 | 64 | 65 | 66 | 67 | 68 | 69 | 70 |
| Delamination | none | none | none | none | none | none | none | none |

1) Parts by weight based on 100 parts by weight of the [PA + (PPS or polyacrylate)] resins.
2) Parts by weight based on 100 parts by weight of the [PA + (PPS or polyacrylate) + compatibilizing agent] resins.

COMPARATIVE EXAMPLES 16 TO 19

The multi-phase structure thermoplastic resins used in Examples 55 to 70 were replaced with ethylene/ethyl acrylate/ maleic anhydride copolymer. The results are set forth in Table 15.

TABLE 15

|  | Comparative Example No. | | | |
| --- | --- | --- | --- | --- |
|  | 16 | 17 | 18 | 19 |
| PA (wt %) | 20 | 60 | 60 | 80 |
| PPS (wt %) | 80 | 40 | — | 20 |
| Polyacrylate (wt %) | — | — | 40 | — |
| Et/EA/MAN Copolymer (pts. wt.)*) | — | 20 | 20 | 20 |
| Notched Izod Impact Strength (kg × cm/cm) | 2.1 | 3.1 | 3.5 | 3.2 |
| Heat Distortion Temperature (°C.) (18.6 kg/cm²) | 145 | 123 | 110 | 109 |
| Delamination | In all of these comparative example, delamination was present. | | | |

*)Parts by weight based on 100 parts by weight of the [PA + (PPS or polyacrylate)] resins.

In Tables 1 to 4, the thermoplastic resin compositions of the present invention in which the polyamide resin is blended with the polyphenylene ether resin are excellent in impact resistance, heat distortion temperature and oil resistance and are conveniently free from delamination. In contrast, the compositions obtained in the comparative examples are poor in surface gloss and have delamination, and additionally in such compositions, impact resistance is not improved and compatibility is also insufficient.

Furthermore, as shown in Tables 6 to 9, with regard to the thermoplastic resin composition of the present invention which comprises the blend of the polyamide resin and the ABS resin or the polycarbonate resin, impact resistance of the polyamide resin is remarkably improved as compared with the products of the comparative examples.

Moreover, Tables 10 to 12 indicate that the blend of the polyamide and the aromatic polyester resin or the polyoxymethylene resin is a balanced resin composition having stiffness, impact resistance and heat resistance. Tables 13 to 15 also indicate that the blend of the polyamide resin and the polyarylene sulfide resin or the polyarylate resin is the resin composition having the remarkably improved heat resistance.

The thermoplastic resin composition of the present invention is an excellent resin composition which maintains the excellent features of the polyamide resin and which additionally has features of a blended resin. Therefore, the thermoplastic resin composition of the present invention can be widely utilized as materials for automobile parts, electrical and electronic parts, industrial parts, and the like.

What is claimed is:

1. A thermoplastic resin composition which is a blend of
   (I) 90 to 10% by weight of a polyamide resin,
   (II) 10 to 90% by weight of a polyphenylene ether resin and,
   (III) 1 to 50 parts by weight, based on 100 parts by weight of said resins (I)+(II), of a multi-phase structure thermoplastic resin which is a graft copolymer composed of (A) 5 to 95% by weight of a copolymer segment of ethylene-ethyl acrylate-maleic anhydride and (B) 95 to 5% by weight of a polystyrene segment, one segment dispersed in the other segment and the particle diameter of the dispersion phase formed from said (A) or said (B) being in the range of 0.001 to 10 μm.

2. A thermoplastic resin composition according to claim 1 wherein said multi-phase structure thermoplastic resin III is a graft polymerization precursor obtained by copolymerizing at least one styrene monomer with at least one of radical polymerizable or copolymerizable organic peroxides of the formulae (a) and (b):

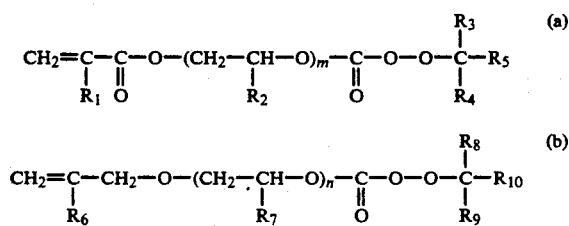

(wherein $R_1$ is a hydrogen atom or an alkyl group having 1 or 2 carbon atoms, each of $R_2$ and $R_7$ is a hydrogen atom or a methyl group, $R_6$ is a hydrogen atom or an alkyl group having 1 to 4 carbon atoms, each of $R_3$, $R_4$, $R_8$ and $R_9$ is an alkyl group having 1 to 4 carbon atoms, each of $R_5$ and $R_{10}$ is an alkyl group having 1 to 12 carbon atoms, a phenyl group, an alkyl-substituted phenyl group or a cycloalkyl group having 3 to 12 carbon atoms, m is 1 or 2, and n is 0, 1 or 2) in particles of at least one ethylene-ethyl acrylate-maleic anhydride copolymer, and optionally melting and kneading said graft polymerization precursor.

3. A thermoplastic resin composition according to claim 1 wherein said multi-phase structure thermoplastic resin is composed of 20 to 90% by weight of (A) and 80 to 10% by weight of (B).

4. A thermoplastic resin composition according to claim 1 wherein said ethylene-ethyl acrylate-maleic anhydride copolymer is a copolymer of 60–99.5% by weight ethylene, 0.5–40% by weight maleic anhydride and 0.39–5% by weight of ethyl acrylate.

5. A thermoplastic resin composition according to claim 1 wherein said particle diameter is in the range of 0.01 to 5 μm.

6. A thermoplastic resin composition according to claim 1 wherein said polystyrene segment (B) has a number average polymerization degree of 5 to 10,000.

7. A thermoplastic resin composition according to claim 6 wherein said number average polymerization degree is 10 to 5,000.

8. A thermoplastic resin composition according to claim 1 in which said polyamide resin is 6-nylon or 6,6-nylon, the amount of polyphenylene ether resin is 10 to 90% by weight, the amount of multi-phase structure thermoplastic resin is 1 to 50 parts by weight based on 100 parts by weight of said resins (I) and (II), said polystyrene has a number average polymerization degree of 10 to 5,000 and constitutes 80 to 10% of said multi-phase structure thermoplastic resin and in which said particle diameter is in the range of 0.01 to 5 μm.

9. The thermoplastic resin composition of claim 1 consisting essentially of said blend.

10. The thermoplastic resin composition of claim 1 consisting of said blend.

UNITED STATES PATENT AND TRADEMARK OFFICE
CERTIFICATE OF CORRECTION

PATENT NO. : 5,244,973
DATED : September 14, 1993
INVENTOR(S) : Suehiro Sakazume, et al.

It is certified that error appears in the above-indentified patent and that said Letters Patent is hereby corrected as shown below:

On the title page, item [73], Assignee should read --Nippon Petrochemicals, Co., Ltd. and Nippon Oil & Fats Co., Ltd., Japan--

Signed and Sealed this

Twenty-ninth Day of March, 1994

Attest:

BRUCE LEHMAN

*Attesting Officer*     *Commissioner of Patents and Trademarks*